(12) United States Patent
Michael

(10) Patent No.: US 11,505,165 B2
(45) Date of Patent: Nov. 22, 2022

(54) DEVICE FOR ACTUATING THE BRAKE AND ACCELERATOR IN A VEHICLE

(71) Applicant: AUDI AG, Ingolstadt (DE)

(72) Inventor: Jörg Michael, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/280,584

(22) PCT Filed: Aug. 29, 2019

(86) PCT No.: PCT/EP2019/073079
§ 371 (c)(1),
(2) Date: Mar. 26, 2021

(87) PCT Pub. No.: WO2020/098990
PCT Pub. Date: May 22, 2020

(65) Prior Publication Data
US 2022/0001843 A1 Jan. 6, 2022

(30) Foreign Application Priority Data

Nov. 15, 2018 (DE) ...................... 10 2018 219 487.4

(51) Int. Cl.
*G05G 1/30* (2008.04)
*B60T 7/04* (2006.01)
(Continued)

(52) U.S. Cl.
CPC .............. *B60T 7/042* (2013.01); *B60K 26/02* (2013.01); *B60N 3/063* (2013.01); *B60T 7/06* (2013.01); *B60K 2026/026* (2013.01)

(58) Field of Classification Search
CPC .. G05G 1/30; G05G 1/32; G05G 1/36; G05G 1/38; G05G 1/40; G05G 1/405;
(Continued)

(56) References Cited

U.S. PATENT DOCUMENTS 1,487,495 A * 3/1924 Von Germeten ....... B60N 3/063
296/75
2,032,157 A * 2/1936 Dresser .................. B60N 3/063
296/75
(Continued)

FOREIGN PATENT DOCUMENTS

DE 10008884 A1 11/2000
DE 102013202427 A1 * 8/2014 ............ B60K 26/02
(Continued)

OTHER PUBLICATIONS

Machine Translation of DE 10 2013 202 427, obtained Jan. 6, 2022.*
(Continued)

*Primary Examiner* — Brian J McGovern
(74) *Attorney, Agent, or Firm* — Sterne, Kessler, Goldstein & Fox P.L.L.C.

(57) ABSTRACT

The present disclosure relates to a device in which a brake member and an accelerator member are arranged in an actuation unit for actuating the brake and accelerator in a vehicle. The actuation unit can be moved from an active driving position during autonomous driving into an at least approximately horizontal position to form a leg rest, the brake member and the accelerator member being deactivated.

10 Claims, 2 Drawing Sheets

(51) Int. Cl.
*B60K 26/02* (2006.01)
*B60N 3/06* (2006.01)
*B60T 7/06* (2006.01)

(58) Field of Classification Search
CPC ............ G05G 1/44; G05G 1/445; G05G 1/48; G05G 1/483; B60K 26/02; B60K 2026/026; B60K 2026/024; B60K 2026/023; B60K 2026/022; B60K 2026/021; B60K 7/04; B60K 7/06; B60R 25/006; B60R 25/005; B60N 3/06; B60N 3/063; B60T 7/04; B60T 7/06
See application file for complete search history.

(56) References Cited

U.S. PATENT DOCUMENTS

| | | | | |
|---|---|---|---|---|
| 2,202,857 | A * | 6/1940 | Jacobs | B60N 3/063 296/75 |
| 6,182,525 | B1 * | 2/2001 | Bowers | B60K 20/02 180/274 |
| 6,241,301 | B1 * | 6/2001 | Speth | B60N 2/0232 180/90.6 |
| 6,349,965 | B1 * | 2/2002 | Heilig | B60R 21/02 280/748 |
| 10,889,226 | B1 * | 1/2021 | Dean | G05G 5/28 |
| 10,906,514 | B1 * | 2/2021 | Kim | B60T 7/06 |
| 10,946,741 | B1 * | 3/2021 | Kim | B60T 7/06 |
| 10,994,611 | B1 * | 5/2021 | Kim | G05G 5/28 |
| 11,021,058 | B1 * | 6/2021 | Kim | B60K 26/021 |
| 2003/0094070 | A1 * | 5/2003 | O'Neill | G05G 1/405 74/560 |
| 2006/0219048 | A1 * | 10/2006 | Ueno | G05G 1/38 74/560 |
| 2009/0223319 | A1 * | 9/2009 | Choi | G05G 1/405 74/512 |
| 2011/0132134 | A1 * | 6/2011 | Kim | F02D 11/02 74/514 |
| 2015/0322835 | A1 * | 11/2015 | Ham | F01N 11/00 701/29.2 |
| 2016/0288684 | A1 * | 10/2016 | Christiansson | B60N 2/06 |
| 2017/0217335 | A1 | 8/2017 | Tominaga et al. | |
| 2017/0225570 | A1 * | 8/2017 | El Aile | B62D 1/183 |
| 2019/0220052 | A1 * | 7/2019 | Kihara | B60K 26/02 |
| 2019/0310678 | A1 * | 10/2019 | Wojciechowski | B60K 26/021 |
| 2020/0257329 | A1 * | 8/2020 | Kihara | B60K 26/02 |
| 2020/0262321 | A1 * | 8/2020 | Masu | B60N 2/20 |
| 2020/0317152 | A1 * | 10/2020 | Ghaffari | G05G 1/40 |
| 2020/0317167 | A1 * | 10/2020 | Ghaffari | B60T 7/06 |
| 2021/0004040 | A1 * | 1/2021 | Dohmen | G05G 5/05 |
| 2021/0170988 | A1 * | 6/2021 | Villalva Sanchez | B60R 21/09 |
| 2021/0331584 | A1 * | 10/2021 | Kim | G05G 1/40 |

FOREIGN PATENT DOCUMENTS

| | | | | |
|---|---|---|---|---|
| DE | 102014223630 A1 * | 5/2016 | | B60N 3/06 |
| DE | 102017215904 A1 | 3/2019 | | |
| EP | 1488963 A1 * | 12/2004 | | B60R 21/09 |
| EP | 2840000 A2 | 2/2015 | | |
| FR | 2831284 A1 | 4/2003 | | |
| FR | 3010974 A1 | 3/2015 | | |
| JP | 2018116383 A | 7/2018 | | |
| KR | 10-2017-0137427 A * | 12/2017 | | B60K 26/02 |

OTHER PUBLICATIONS

Machine Translation of DE 10 2014 223 630, obtained Jan. 6, 2022.*
"Linear Actuator," Wikipedia Page, dated by Wayback Machine to Oct. 28, 2017, url:<https://web.archive.org/web/20171028212034/https://en.wikipedia.org/wiki/Linear_actuator>.*
"Gas Spring," Wikipedia Page, dated by Waybac, Machine to Dec. 6, 2016, url:<https://web.archive.org/web/20161206160704/https://en.wikipedia.org/wiki/Gas_spring>.*
Machine Translation of KR 10-2017-0137427.*
International Preliminary Report on Patentability directed to related International Patent Application No. PCT/EP2019/073079 dated May 18, 2021, with attached English-language translation; 12 pages.
International Search Report and Written Opinion of the International Searching Authority directed to related International Patent Application No. PCT/EP201 9/073079, dated Nov. 21, 2019, with attached English-language translation; 14 pages.

* cited by examiner

DEVICE FOR ACTUATING THE BRAKE AND ACCELERATOR IN A VEHICLE

TECHNICAL FIELD

The present disclosure relates to a device for actuating the brake and accelerator in a vehicle wherein the brake and the accelerator are arranged in an actuation unit.

BACKGROUND

There are two driving states in automated vehicles. In one state, a driver operates the steering wheel, accelerator and brake pedals in the conventional manner and thus drives the vehicle fully actively. There is also a driving state in which the vehicle is controlled by a computer and thus moved autonomously.

If the driver wants to relax while driving autonomously and would like to take, for example, a lying position on his seat, an element is required on which the driver can rest his legs.

FR 3 010 974 A1 discloses to cover the accelerator and brake pedals during autonomous driving by a leg rest plate on which the driver can rest his legs. A similar embodiment is disclosed in JP 2018-116383 A.

It is also known to integrate a leg rest element into the driver's seat.

The disadvantage of the known solutions, however, is that, in autonomous driving, the foot rest elements represent increased effort and require additional installation space, which is not always available in the required amount in the driver's footwell region.

BRIEF DESCRIPTION OF THE DRAWINGS/FIGURES

DETAILED DESCRIPTION

In a so-called "drive-by-wire" system, instead of a mechanical power transmission from the accelerator pedal and brake pedal, two pressure plates are used with a travel simulator absorbing the driver's actuation energy on the pressure plates. This travel simulator has a pedal force and pedal travel identifier. The actuation of functions takes place via electrical cables and servo motors, or electromechanical actuators. The two pressure plates for accelerator and brake actuation are arranged together in one actuation unit.

The present disclosure is therefore based on the object of creating a device for actuating the brake and accelerator in a vehicle, which, in connection with the "drive-by-wire" system in autonomous driving, allows for a leg rest for the driver in a simple manner and without special additional installation space.

In some embodiments, instead of an additional or separate leg rest, the actuation unit is used as a leg rest for the driver's legs during autonomous driving. The leg rest is adjusted to an at least approximately horizontal position, and the actuating elements for the brake and accelerator being deactivated accordingly.

In some embodiments, the actuation unit is arranged on a base housing, for example a bearing unit, so as to pivot about a horizontal axis, whereby the actuation unit can be pivoted from its active "normal" position into an at least approximately horizontal position to support the driver's legs.

In some embodiments, the actuating members for the brake and accelerator can be designed as pressure plates, which are arranged in the actuation unit.

By way of a non-limiting example, sensor elements can also be used for this purpose, which pass on the distance and pressure level via a sensor system during active driving in order to actuate the brake and accelerator.

Figure 1:
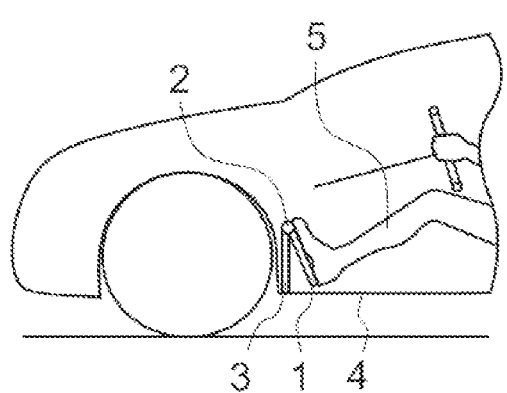
FIG. 1 shows a section of a vehicle in an active driving position, in accordance with some embodiments.

FIG. 1 shows a section of a vehicle in an active driving position, in accordance with some embodiments. According to FIG. 1, an actuation unit 1 is provided for the driver to actuate the accelerator and brake, which is arranged so as to pivot via a pivot joint 2 on a bearing unit as the base housing 3. The bearing unit 3 is fastened to a body part 4 of the vehicle. A brake member 6 and an accelerator member 7 in the form of pressure plates 6 and 7 (see representations in FIGS. 3 to 5) are actuated during normal driving operation with the driver's legs 5.

Figure 2:
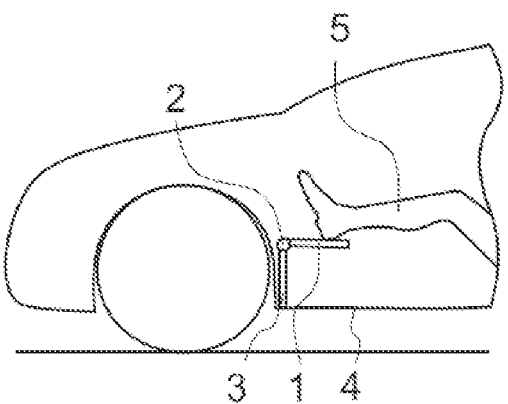
FIG. 2 shows a section of the vehicle according to FIG. 1 with an autonomous driving style, in accordance with some embodiments.

FIG. 2 shows a section of the vehicle according to FIG. 1 with an autonomous driving style, in accordance with some embodiments. FIG. 2 shows the actuation unit 1 in a position as a leg rest during autonomous driving. As can be seen, the actuation unit 1 is pivoted into a horizontal position, as a result of which the driver can rest his legs 5 on the actuation unit 1 in a lying position.

Figure 3:
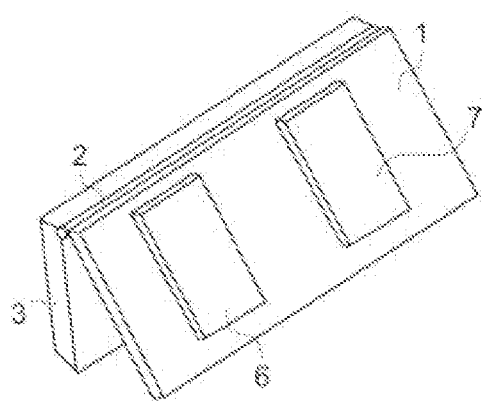
FIG. 3 is a perspective representation of an actuation unit for actuating the brake and accelerator in the active driving position, in accordance with some embodiments.
Figure 4:
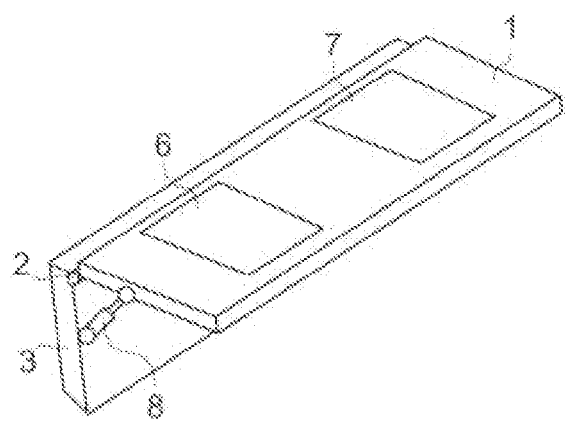
FIG. 4 shows the actuation unit according to FIG. 3 in the form of a leg rest for autonomous driving, in accordance with some embodiments.

The configuration of the actuation unit 1 can be seen in an enlarged representation from FIGS. 3 and 4. FIG. 3 is a perspective representation of an actuation unit for actuating the brake and accelerator in the active driving position, in accordance with some embodiments. A pressure plate 6 for the brake as a brake member and a pressure plate 7 for the accelerator as an accelerator member protrude from the surface of the actuation unit 1. The two pressure plates 6 and 7 are controlled in a known manner with regard to their functions via signal transmitters (not shown in more detail) when the driver is driving himself.

FIG. 4 shows the actuation unit according to FIG. 3 in the form of a leg rest for autonomous driving, in accordance with some embodiments. FIG. 4 shows an embodiment of the actuation unit 1 according to FIG. 3 in a horizontally pivoted or folded position by the pivot joint 2 for use as a leg rest. In this position of the actuation unit 1, the functions of the two pressure plates 6 and 7 as accelerator and brake signal generators are deactivated via software.

The actuation unit 1 can be brought into the respectively desired position by activating the pivot joint 2 via a gas spring 8 (see FIG. 4) or via electrical spindles.

So that a smooth surface of the actuation unit 1 is given as a leg rest in the autonomous driving style, the two pressure plates 6 and 7 can be arranged so as to be retractable in the actuation unit 1 so that they are flush with the surface in this position and do not represent any interfering edges.

Figure 5:
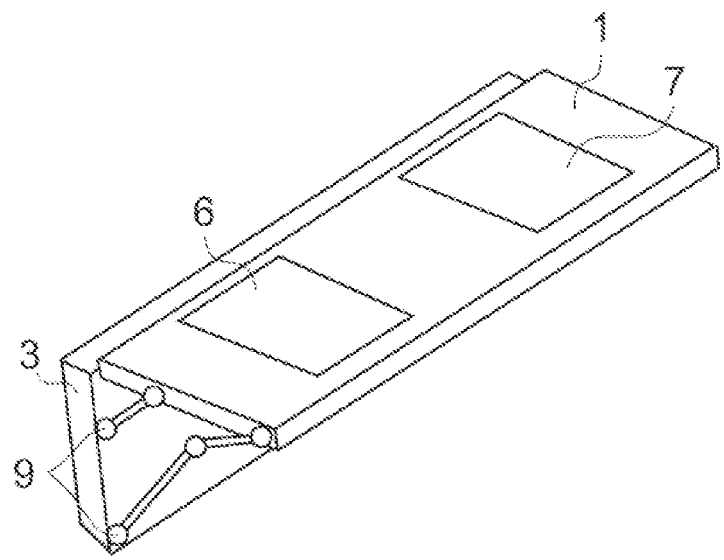
FIG. 5 shows a section of an actuation unit with an articulated gear, in accordance with some embodiments.

FIG. 5 shows a section of an actuation unit with an articulated gear, in accordance with some embodiments.

FIG. 5 shows a section of the adjustment of the actuation unit 1 in a schematic diagram via a mechanical articulated gear 9, through which a horizontal displacement takes place simultaneously when the actuation unit 1 is pivoted from the active position into a horizontal position for the leg rest.

Figure 6:
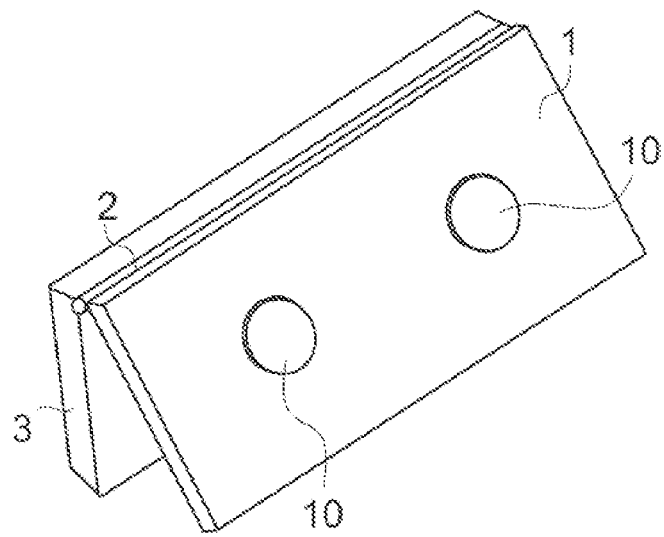
FIG. 6 shows a section of an actuation unit with sensor elements as brake member and accelerator member, in accordance with some embodiments.

FIG. 6 shows a section of an actuation unit with sensor elements as brake member and accelerator member, in accordance with some embodiments. From FIG. 6, it can be seen that instead of pressure plates 6 and 7 sensor elements 10 are provided in the actuation unit 1 as brake and accelerator members, via which appropriate control signals for their function are passed on when activated in the normal driving state and in the autonomous driving state. During active driving operation, the sensor elements 10, like the pressure plates 6 and 7, are above the surface of the actuation unit 1. In the autonomous driving operation, they are retracted and flush with the surface of the actuation unit 1.

The invention claimed is:

1. A device for actuating a brake and an accelerator in a vehicle, the device comprising:
   a controller configured to implement a manual driving mode and an autonomous driving mode for the vehicle;
   a brake member configured to control the brake;
   an accelerator member configured to control the accelerator;
   an actuation unit, wherein the brake member and the accelerator member are disposed on and supported for actuation on the actuation unit;
   wherein each of the brake member and the accelerator member protrude from the actuation unit during the manual driving mode;
   wherein the actuation unit is configured to pivot from an active driving position during the manual driving mode into a leg rest position during the autonomous driving mode;
   wherein each of the brake member and the accelerator member are configured to retract into the actuation unit so as to not protrude from the actuation unit during the autonomous driving mode;
   wherein each of the brake member and the accelerator member are configured to be deactivated during the autonomous driving mode.

2. The device of claim 1, wherein the actuation unit is foldable about a pivot joint on a base housing.

3. The device of claim 1, wherein the leg rest position is an at least approximately horizontal position.

4. The device of claim 1, wherein each of the brake member and the accelerator member are configured as retractable to be at least approximately flush with a surface of the actuation unit in the autonomous driving mode.

5. The device of claim 1, wherein the brake member and the accelerator member are configured as pressure plates.

6. The device of claim 1, wherein the brake member and the accelerator member are designed as sensor elements of a sensor system, the sensor elements being configured to transmit a distance and a pressure level to actuate the brake and accelerator during the manual driving mode.

7. The device of claim 1, wherein the actuation unit is configured to move via a gas spring element.

8. The device of claim 1, wherein the actuation unit is configured to move via an electrical spindle.

9. The device of claim 1, wherein the actuation unit is configured to pivot about a horizontal axis or displaced in a horizontal direction via a gear.

10. The device of claim 1, wherein the brake member and the accelerator member are deactivated via software during the autonomous driving mode.

* * * * *